US012492660B2

(12) United States Patent
Riederer et al.

(10) Patent No.: US 12,492,660 B2
(45) Date of Patent: Dec. 9, 2025

(54) FULLY ENCLOSING ENGINE OR UNIT CAPSULE OF A MOTOR VEHICLE WITH AIR CUSHION FOIL

(71) Applicant: Adler Pelzer Holding GmbH, Hagen (DE)

(72) Inventors: Frank Riederer, Witten (DE); Thomas Karcz, Dortmund (DE); Volkmar Schulze, Schierling (DE)

(73) Assignee: ADLER PELZER HOLDING GMBH, Hagen (DE)

( * ) Notice: Subject to any disclaimer, the term of this patent is extended or adjusted under 35 U.S.C. 154(b) by 137 days.

(21) Appl. No.: 17/916,988

(22) PCT Filed: Apr. 14, 2021

(86) PCT No.: PCT/EP2021/059712
§ 371 (c)(1),
(2) Date: Oct. 4, 2022

(87) PCT Pub. No.: WO2021/209522
PCT Pub. Date: Oct. 21, 2021

(65) Prior Publication Data
US 2023/0160336 A1 May 25, 2023

(30) Foreign Application Priority Data
Apr. 16, 2020 (DE) .................... 10 2020 110 433.2

(51) Int. Cl.
F02B 77/13 (2006.01)
B32B 3/26 (2006.01)
(Continued)

(52) U.S. Cl.
CPC .............. *F02B 77/13* (2013.01); *B32B 3/266* (2013.01); *B32B 3/30* (2013.01); *B32B 5/022* (2013.01);
(Continued)

(58) Field of Classification Search
CPC ................. B32B 5/022; B32B 27/065; B32B 2262/0253; B32B 2262/0261;
(Continued)

(56) References Cited

U.S. PATENT DOCUMENTS 4,114,714 A * 9/1978 Fachbach ............ B60R 13/0861
181/204
4,522,165 A * 6/1985 Ogawa ................... B32B 5/245
181/204
(Continued)

FOREIGN PATENT DOCUMENTS

DE 7929637 1/1980 ........... B60R 136/08
DE 3531886 3/1987 ............. G10K 11/16
(Continued)

OTHER PUBLICATIONS

Notice of Reasons for Refusal issued in Japanese Patent Appln. Serial No. 2022-562751, dated Sep. 27, 2024, with machine English translation, 8 pages.
(Continued)

Primary Examiner — Forrest M Phillips
Assistant Examiner — Joseph James Peter Illicete
(74) Attorney, Agent, or Firm — HAYES SOLOWAY P.C.

(57) ABSTRACT

Disclosed is a fully enclosing engine or unit capsule of a motor vehicle with an air cushion foil, whereby the acoustic component properties can be significantly influenced, tuned.

13 Claims, 3 Drawing Sheets

(51) Int. Cl.
    *B32B 3/30*         (2006.01)
    *B32B 5/02*         (2006.01)
    *B32B 5/18*         (2006.01)
    *B32B 5/24*         (2006.01)
    *B32B 27/06*       (2006.01)
    *B32B 27/08*       (2006.01)
    *B32B 27/34*       (2006.01)
    *B32B 27/36*       (2006.01)

(52) U.S. Cl.
    CPC ............ B32B 5/18 (2013.01); B32B 5/245 (2013.01); B32B 27/065 (2013.01); B32B 27/08 (2013.01); B32B 27/34 (2013.01); B32B 27/36 (2013.01); *B32B 2262/0253* (2013.01); *B32B 2262/0261* (2013.01); *B32B 2262/0284* (2013.01); *B32B 2262/144* (2021.05); *B32B 2266/0278* (2013.01); *B32B 2307/102* (2013.01); *B32B 2307/536* (2013.01); *B32B 2307/54* (2013.01); *B32B 2307/718* (2013.01); *B32B 2307/72* (2013.01); *B32B 2307/732* (2013.01); *B32B 2605/08* (2013.01)

(58) Field of Classification Search
    CPC .... B32B 2262/0284; B32B 2266/0278; B60R 13/0838; F02B 77/13; G10K 11/16; C08G 18/4829
    USPC ........................................................ 181/204
    See application file for complete search history.

(56) References Cited

U.S. PATENT DOCUMENTS

| | | | | |
|---|---|---|---|---|
| 4,705,137 | A | 11/1987 | Gahlau et al. | 181/290 |
| 4,705,139 | A | 11/1987 | Gahlau et al. | |
| 5,633,067 | A * | 5/1997 | Illbruck | B60R 13/0838 |
| | | | | 428/338 |
| 7,398,855 | B2 * | 7/2008 | Seel | F01C 21/10 |
| | | | | 181/202 |
| 7,954,596 | B2 * | 6/2011 | Schulze | G10K 11/168 |
| | | | | 181/290 |
| 8,960,365 | B2 * | 2/2015 | Sheng | G10K 11/172 |
| | | | | 181/207 |
| 9,702,141 | B2 * | 7/2017 | Nicolai | E04B 1/84 |
| 10,131,383 | B2 | 11/2018 | Job et al. | B62D 25/161 |
| 2004/0056386 | A1 * | 3/2004 | Gebreselassie | B29C 43/203 |
| | | | | 264/324 |
| 2005/0168343 | A1 | 8/2005 | Longsdorf et al. | |
| 2006/0024495 | A1 | 2/2006 | Romling et al. | B32B 7/12 |
| 2006/0289231 | A1 | 12/2006 | Priebe et al. | |
| 2008/0020199 | A1 | 1/2008 | Augele et al. | G10K 11/168 |
| 2009/0026008 | A1 * | 1/2009 | Krus | G10K 11/16 |
| | | | | 181/210 |
| 2010/0224438 | A1 | 9/2010 | Schulze et al. | |
| 2012/0080262 | A1 | 4/2012 | Soltau et al. | |
| 2014/0202668 | A1 * | 7/2014 | Krus | F01N 13/14 |
| | | | | 165/135 |
| 2019/0375193 | A1 | 12/2019 | Veiseh | B32B 15/085 |
| 2022/0259367 | A1 | 8/2022 | Riederer et al. | C08G 18/08 |

FOREIGN PATENT DOCUMENTS

| | | | |
|---|---|---|---|
| DE | 19935335 | 2/2001 | |
| DE | 10022902 | 3/2001 | ............ B60R 13/08 |
| DE | 1477299 | 11/2004 | ............... B32B 3/12 |
| DE | 102004022895 | 12/2005 | ............ G10K 11/16 |
| DE | 102005003994 | 8/2006 | ............ G10K 11/16 |
| DE | 102006009134 A1 | 8/2007 | |
| DE | 202008014014 | 3/2009 | ............. A45C 11/24 |
| DE | 202009014881 | 4/2010 | ............. B65D 27/00 |
| DE | 202010008483 | 12/2010 | ............. B65D 81/03 |
| DE | 202019101109 | 8/2019 | ............... B32B 5/18 |
| EP | 1477299 | 11/2004 | ............... B32B 3/12 |
| EP | 1621330 | 2/2006 | ............... B32B 3/28 |
| EP | 1852314 A1 * | 11/2007 | ............. B60R 13/01 |
| EP | 2484826 A1 | 8/2012 | |
| JP | S5953148 U | 4/1984 | |
| JP | 2008537625 A | 9/2008 | |
| JP | 2009540183 A | 11/2009 | |
| JP | 2012162112 A | 8/2012 | |
| JP | 2012245834 A | 12/2012 | |
| WO | WO2020216743 | 10/2020 | ............. C08G 18/48 |

OTHER PUBLICATIONS

PCT International Search Report issued in PCT International Patent Application Serial No. PCT/EP2021/059712, dated Jun. 23, 2021, 24 pgs.

* cited by examiner

FULLY ENCLOSING ENGINE OR UNIT CAPSULE OF A MOTOR VEHICLE WITH AIR CUSHION FOIL

BACKGROUND OF THE INVENTION

The subject matter of the invention is a fully enclosing engine or unit capsule of a motor vehicle with an air cushion foil, whereby the acoustic component properties can be significantly influenced, tuned.

In the state of the art, air cushion foil applications are known, which mainly concern the packaging sector. These are used here as insulating packaging, in particular for the storage, transport and dispatch of temperature-sensitive—heat and cold-sensitive—as well as shock-sensitive products; see for example DE 20 2019 101 109 U1.

In this regard, US 2019/0375193 A1 discloses an insulating packaging material typically manufactured using thermoplastics, such as a polyethylene (PE) air cushion foil laminated to a metallised polyester (PET) film. This material exhibits insulating properties due to the heat reflective properties of the metallised polyester as well as the air encapsulation of the air cushion foil.

In addition to two- and three-layer PE air cushion foils, polypropylene (PP) air cushion foils are also known (EP 1 477 299 B1, DE 60 2004 007 185 T2).

Recyclable air cushion foils are also found, the biodegradable plastic is polylactic acid (PLA), a polyhydroxyalkanoate (PHA), in particular polyhydroxybutyrate (PHB), a blend of thermo-plastic starch or mixtures of these and/or other biodegradable additives (DE 20 2009 014 881 U1); furthermore a biodegradable aliphatic-aromatic copolyester or a blend of at least one biodegradable aliphatic-aromatic copolyester and poly lactic acid or thermoplastic starch (DE 20 2010 008 483 U1).

Furthermore, self-adhesive (EP 1 621 330 B1) and textile fabric (DE 20 2008 014 014 U1) air cushion foils are known.

Especially in the literature on the automotive industry, one finds the insertion and re-foaming of hollow chambers or cushion-shaped foil packages (air cushions) in the floor panelling foam insulation (DE 35 31 886 C2).

It is also suggested to fill the cushions with a gas that is lighter than air, for example helium (DE 79 29 637 U1).

In practice, however, the insertion and foaming of hollow chambers or cushion-shaped foil packages (air cushions) has not proved successful.

Of course, air gaps or air cushions can also be found in other sound insulation, such as bulk-heads, wheel arch liners and underside panelling. DE 10 2004 022 895 A1 discloses a cladding part made of thermoplastic material for shielding the engine and/or the exhaust system, which has at least partially hollow bodies. In the case of wheel arch liners, this is described in US 2018/0050731 A1 and U.S. Pat. No. 10,131,383 B2. DE 100 22 902 A1 discloses an air gap in the roof fining of a motor vehicle by means of a variable wall spacing.

An inflatable air cushion consisting of a damping-active envelope made of an elastic material between a sound-emitting component and the interior of the passenger compartment of a vehicle is described in DE 10 2004 037 767 B4, US 2008/0020199 A1.

DE 10 2005 003 994 B4 describes a method for manufacturing an acoustic absorber and various applications in general. Among other things, it is stated that the hollow chamber elements can be made with different dimensions in terms of height, diameter and width, and that the hollow chamber elements can be made with a different tension or slackness of the outer skin.

SUMMARY OF THE INVENTION

The object of the present invention in comparison with the aforementioned prior art is thus to provide sound insulation, in particular engine and unit capsules, using air cushion foil which withstands the process parameters required in the manufacture of sound insulation and ensures a secure bond and positioning with adjacent layers so that, when used in an engine or unit capsule, decoupling of the excitation of the earner layer by the component to be encapsulated by positioning the air cushion foil between the carrier layer and PUR foam.

BRIEF DESCRIPTION OF THE DRAWINGS

Further features and advantages of the present invention will be seen from the following detailed description taken in conjunction with the following drawings, wherein.

DETAILED DESCRIPTION OF THE DRAWINGS

Figure 1:
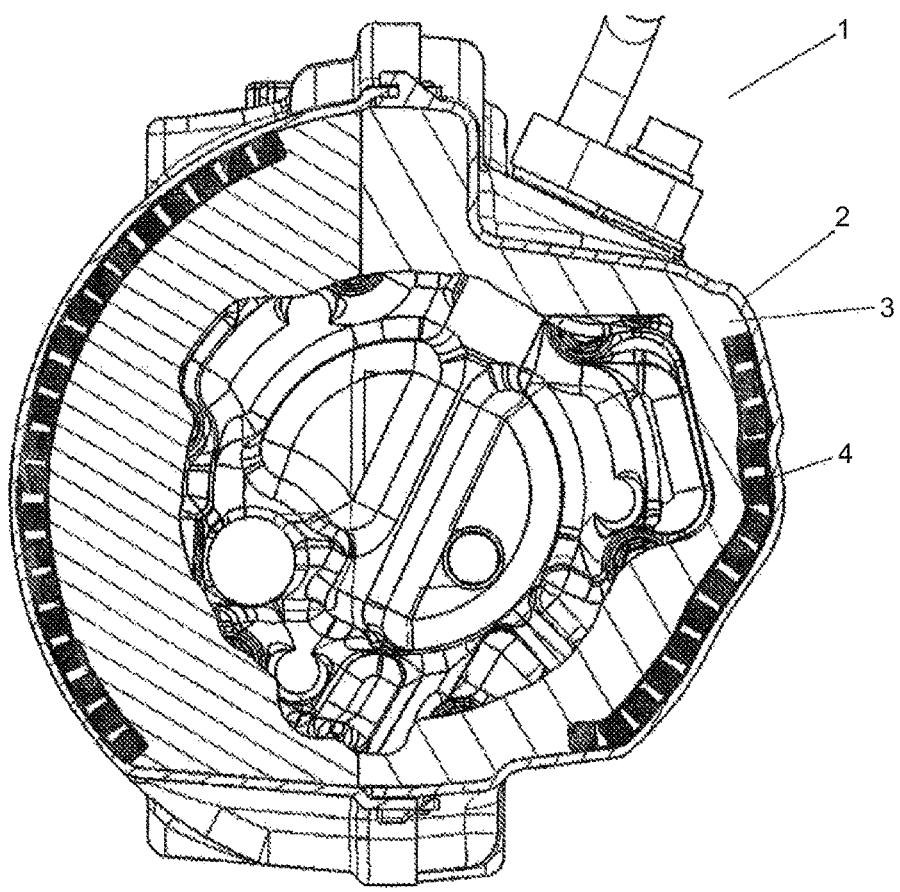
FIG. 1 is a cross-sectional view of a fully enclosing engine or unit capsule of a motor vehicle in accordance with an embodiment of the invention.

In a first embodiment, the subject matter of the present invention is to provide a fully enclosing unit capsule 1 with a (a) a sound-absorbing support layer 2 made of a flexible compound with Shore (A) hardness in the range of 60 to 95, a required thickness in the range of 1.2 to 4 mm, a weight per unit area of 1.44 to 12 $g/m^2$ resulting from a density of 1.2 to 3.0 $g/cm^3$, (b) a polyurethane (PUR) foam 3 with a density in the range of 45 to 105 g/l, a storage module in the range of 20 to 250 $kN/m^2$, and a loss factor of 0.3 to 0.8, and (c) an at least two-layer air cushion foil 4 of polyethylene terephthalate (PET), polyamide (PA) 6 or 6.6 partially or over the entire surface between the carrier layer 2 and the PUR foam 3.

No air cushion applications in the field of engine or unit capsules are known from the state of the art, especially from the motor vehicle industry.

On the one hand, the air cushion foil material is not mentioned at all, and on the other hand, only PE is mentioned. There are also no statements on the adhesion of PUR foam to air cushion foils, for example, because PUR foam does not adhere to PE.

Furthermore, there are no statements on positioning/fixing in multilayer composites and the associated manufacturing technology of the sound insulation component. It is precisely here, due to the required process parameters (temperature, pressure . . . ) in the thermoforming processes and backfoaming processes, that the focus is on the foil material according to the invention.

The support layer 2 can be manufactured in various ways. Particularly preferred in the sense of the present invention is the injection moulding of the carrier layer 2, as this provides a contour-true, surface weight-optimised design and at the same time ensures reproducibility. Thus, the sound-insulating carrier layer 2 can have a thickness in the range of 1.2 to 4 mm and a density of 1.2 to 3.0 g/cm$^3$, resulting in a weight per unit area of 1.44 to 12 kg/m$^2$. Within the aforementioned density, thickness and weight per unit area, these parameters can be varied locally depending on the requirements.

The PUR foam 3 can also be bonded to the air cushion foil 4 in any way. It is particularly preferred in the sense of the present invention to back-foam the PUR foam 3. For this purpose, the preliminary product consisting of carrier layer 2 and air cushion foil 4 is placed in an appropriately contoured mould and backfoamed with the raw material of the foam in a manner known per se.

Particularly preferably, the PUR foam 3 has a density in the range of 55 to 85 g/l and/or a storage modulus in the range of 40 to 100 kN/m$^2$ and/or a loss factor of 0.33 to 0.50; thus, the softness of the spring and its viscoelasticity (of the PUR foam 3) is ensured.

Air cushion foil 4 is commercially available in a wide variety of specifications, in particular, a distinction is made between two-layer and three-layer air cushion foil 4. These usually consist of two layers of welded thermoplastic, rarely thermoset, material, a smooth cover film and a second layer in which mostly round air cushions are incorporated at regular intervals by means of a nub-cylinder and a vacuum roller, which are known to serve to absorb impacts. Three-layer versions have a second smooth cover film and are therefore more resilient. According to Wikipedia (keyword: air cushion foil; retrieved March 2020), small-nub films have a nub diameter of about 10 mm, while large-nub films have a nub diameter of 25 mm. According to the invention, air cushion foils with a nob diameter in the range of 2 to 20 mm and a cylinder height (nub height) in the range of to 15 mm are particularly preferred.

The air cushion foil 4 can fill the entire installation space between the carrier layer 2 and the PUR foam 3, all around the outer surface. However, according to the invention, the air cushion foil 4 is cut accordingly before insertion so that the air cushion foil 4 is positioned equally in geometry/contour over the surface and/or according to requirements.

In the same way, according to the invention, it is also possible for the air cushion foil 4 to be positioned in the same geometry/contour of the individual air cushions over the surface and/or according to requirements. In particular, the diameters and/or heights of the nub cylinders are varied over the surface of the air cushion foil.

A further possible variation of the application-oriented variation of the air cushion foil 4 consists in a different filling of the nub cylinders. For example, it is preferred according to the invention to fill the individual air cushions of the air cushion foil 4 with air, nitrogen or a (inert) gas.

Alternatively or cumulatively, it is also possible according to the invention to partially or completely fill individual air cushions of the air cushion foil 4 with:
 fibres, in particular plastic fibres, plant-based fibres, animal fibres and/or inorganic fibres;
 foam flakes, in particular polyurethane foam flakes, polyester foam flakes and/or polyolefin foam flakes;
 feathers;
 hollow bodies in particular polyolefin, ceramic, glass, EPS, EPP and/or PEPP;
 wood chips;
 wood flour
 as a single material and/or mixtures of two or more of the materials.

Particularly preferably, the individual foils of the air cushion foil 4 have a foil thickness in the range of 20 and 500 µm.

In a further embodiment of the invention, the air cushion foil 4 comprises on its upper and/or lower side a non-woven film made of PA plus PET fibre. PET plus PET fibre and/or PE plus PET fibre; in this way, the bonding of further layers is solved more efficiently and stably.

It is possible to glue the air cushion foil 4 onto the carrier layer 2, or to weld it on, for example. However, this means that the air cushion foil 4 is either self-adhesive (expensive) or has to be glued on by means of an additional adhesive in a further process step (expensive, cycle time). With all known fastening methods—gluing, welding and the like—additional process steps are required which significantly increase the manufacturing costs of the capsule. Accordingly, the air cushion foil 4 preferably has apertures 5 for fastening to the carrier layer 2 according to the invention. Thus, the PUR foam 3 fixes the air cushion foil 4 punctually to the carrier layer 2 without any further processing steps or equipment itself.

The core of the present invention is therefore the provision of an acoustically and thermally effective, fully enclosing engine or unit capsule 1 in which a requirement-related possibly differently designed weight per unit area over the carrier layer surface, combined with an in particular hydrolysis-resistant, viscoelastic PUR foam and a soundproof capsule element overlap design, go hand in hand, in which between carrier layer 2 and PUR-foam 3 a multi-layer air cushion foil consisting in particular of PA 6 or PA 6.6 is positioned in the geometry/contour of the individual air cushions (nubs)—identical and/or different over the surface—as required.

The advantage of the present invention lies in particular in the combination of carrier layer 2, including integrated overlap and closure mechanism, and foam system 3 in such a way that the carrier layer 2 can have demand-oriented weights per unit area, the foam system is acoustically highly effective, and in particular also resistant to hydrolysis,
 the openings for cables and the like in the fully enclosing capsule 1 do not represent acoustic leakage points, as does the (form-fitting) edge/overlap design of capsule elements/shells and by positioning a multi-layer air cushion foil 4, consisting in particular of PA 6 or PA 6.6, between the carrier layer 2 and the PUR foam 3, a decoupling of the excitation of the carrier layer 2 by the component to be encapsulated takes place.

Example of Execution

Using a self-formulated PP-based compound, essentially consisting of TPE/PP and mineral fillers, a carrier layer 2 with a weight per unit area of 5 kg/m$^2$, uniform over the entire surface, and a Shore (A) hardness of 78 was produced by injection moulding.

After inserting the injection-moulded carrier layer 2 into the foaming tool, a commercially available PA6-based air cushion foil 4 (total thickness 3 mm, nub cylinder diameter 10 mm, with positional punched holes 5 for positioning on the carrier layer 2) was placed on top and then this was back-foamed with a commercially available soft-adhesive PUR foam 3, density 80 g/l storage modulus of 90 kN/m$^2$ and a loss factor of 0.4.

After application of the capsule around a motor vehicle unit as shown in FIG. 1, it was measured on a test stand; airborne sound dB(A).

Figure 2:
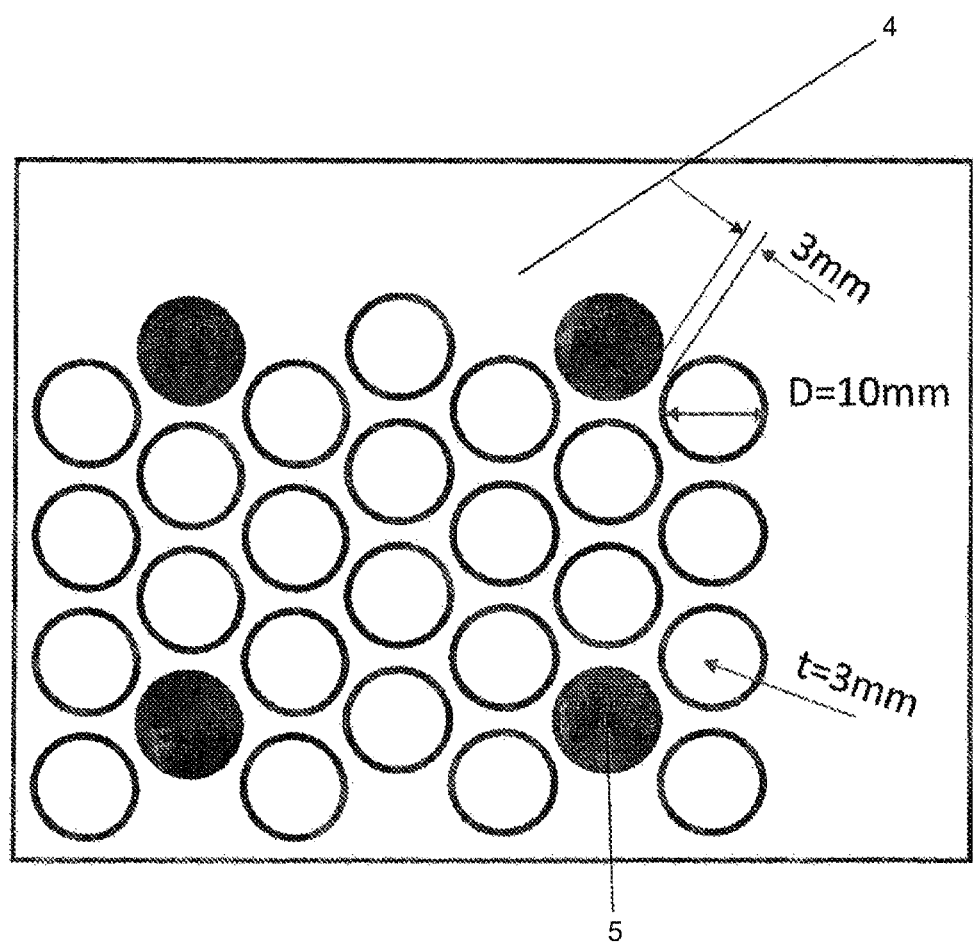
FIG. 2 illustrates a two-layer air cushion foil in accordance with the present invention.

FIG. 1 shows the unit capsule 1; with the positioning of the air cushion foil 4 between PUR cold foam 3 and the injection moulded carrier layer 2. The two-layer PAS-based air cushion foil 4 is explained in more detail in FIG. 2.

Figure 3:
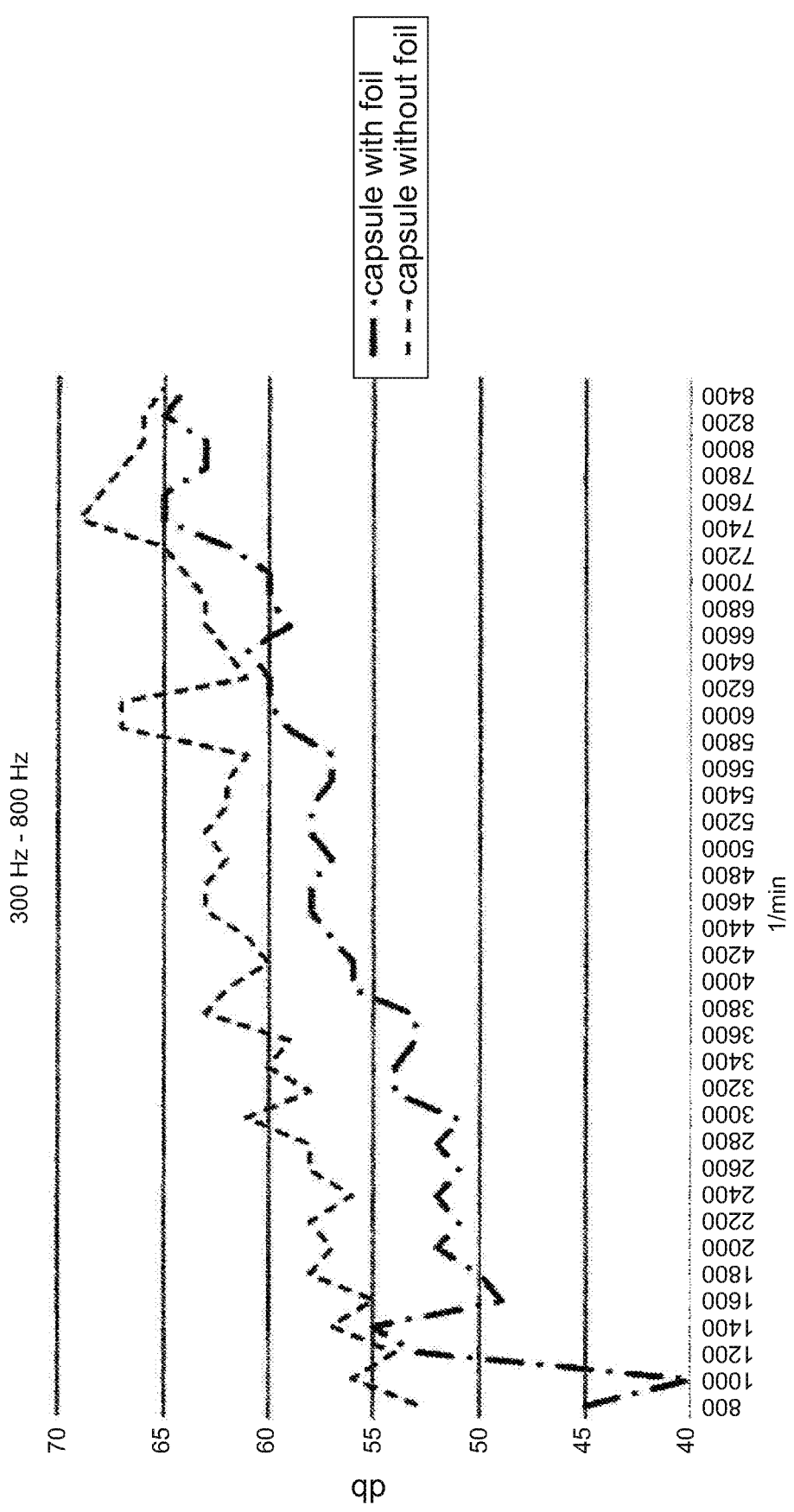
FIG. 3 is a graph showing the difference in acoustic efficiency in accordance with the present invention.

FIG. 3 clearly shows the difference in the acoustic efficiency of the capsule without and with air cushion foil 4 Especially in the critical middle frequency range between band pass (filter) BP 300 and 800 Hz [level reduction approx. 6 dB].

The invention claimed is:

1. A fully enclosing engine or unit capsule of a motor vehicle, said fully enclosing engine or unit comprising
   (a) a sound-absorbing support layer made of a flexible compound with Shore hardness in the range of 60 to 95, a thickness in the range of 1.2 to 4 mm, a weight per unit area of 1.44 to 12 kg/m² resulting from a density of 1.2 to 3.0 g/cm³,
   (b) a PUR-foam with a density in the range of 45 to 105 g/l, a storage modulus in the range of 20 to 250 kN/m², and a loss factor of 0.3 to 0.8, and
   (c) an at least two-layer, cushion foil filled with air, nitrogen or an inert gas and formed of polyethylene terephthalate (PET), polyamide (PA) 6 or 6.6 partially or over an entire surface between the carrier layer and the PUR foam, and
   wherein the cushion foil has individual nubs having the same or different geometries/contours.

2. The fully enclosing engine or unit capsule according to claim 1, wherein the carrier layer is injection moulded.

3. The fully enclosing engine or unit capsule according to claim 1, wherein the thickness and density of the support layer vary in each case according to requirements.

4. The fully enclosing engine or unit capsule according to claim 1, wherein the PUR foam is foam-in-place.

5. The fully enclosing engine or unit capsule according to claim 1, wherein the PUR foam has a density in the range from 55 to 85 g/l and/or a storage module in the range from 40 to 100 kN/m² and/or a loss factor of 0.33 to 0.50.

6. The fully enclosing engine or unit capsule according to claim 1, wherein the cushion foil is at least two-layered.

7. The fully enclosing engine or unit capsule according to claim 1, wherein the cushion foil is positioned uniformly in geometry/contour over the entire surface between the carrier layer and the PUR foam and/or according to requirements.

8. The fully enclosing engine or unit capsule, according to claim 1, wherein the cushion foil is positioned in geometry/contour of the individual cushions over the surface in the same way and/or according to requirements.

9. The fully enclosing engine or unit capsule according to claim 8, wherein individual cushions of the cushion foil are partially or completely filled with:
   fibres; foam flakes; feathers; hollow bodies; wood chips; wood flour as a single material and/or mixtures of two or more of the materials.

10. The fully enclosing engine or unit capsule according to claim 1, wherein the cushion foil comprises on its upper and/or lower side a film fleece made of PA plus PET fibre, PET plus PET fibre and/or PE plus PET fibre.

11. The fully enclosing engine or unit capsule, according to claim 1, wherein the cushion foil has apertures for fastening the cushion foil to the carrier layer.

12. The fully enclosing engine or unit capsule according to claim 8, wherein the individual foils of the cushion foil have a foil thickness in the range of 20 and 500 µm.

13. The fully enclosing engine or unit capsule according to claim 1, wherein the at least two-layer cushion foil is over an entire surface between the carrier layer and the PUR foam.

* * * * *